Nov. 14, 1944.  C. GALL ET AL  2,362,749
TRUCK FOR HANDLING PIG METAL
Filed Oct. 18, 1943  2 Sheets-Sheet 1
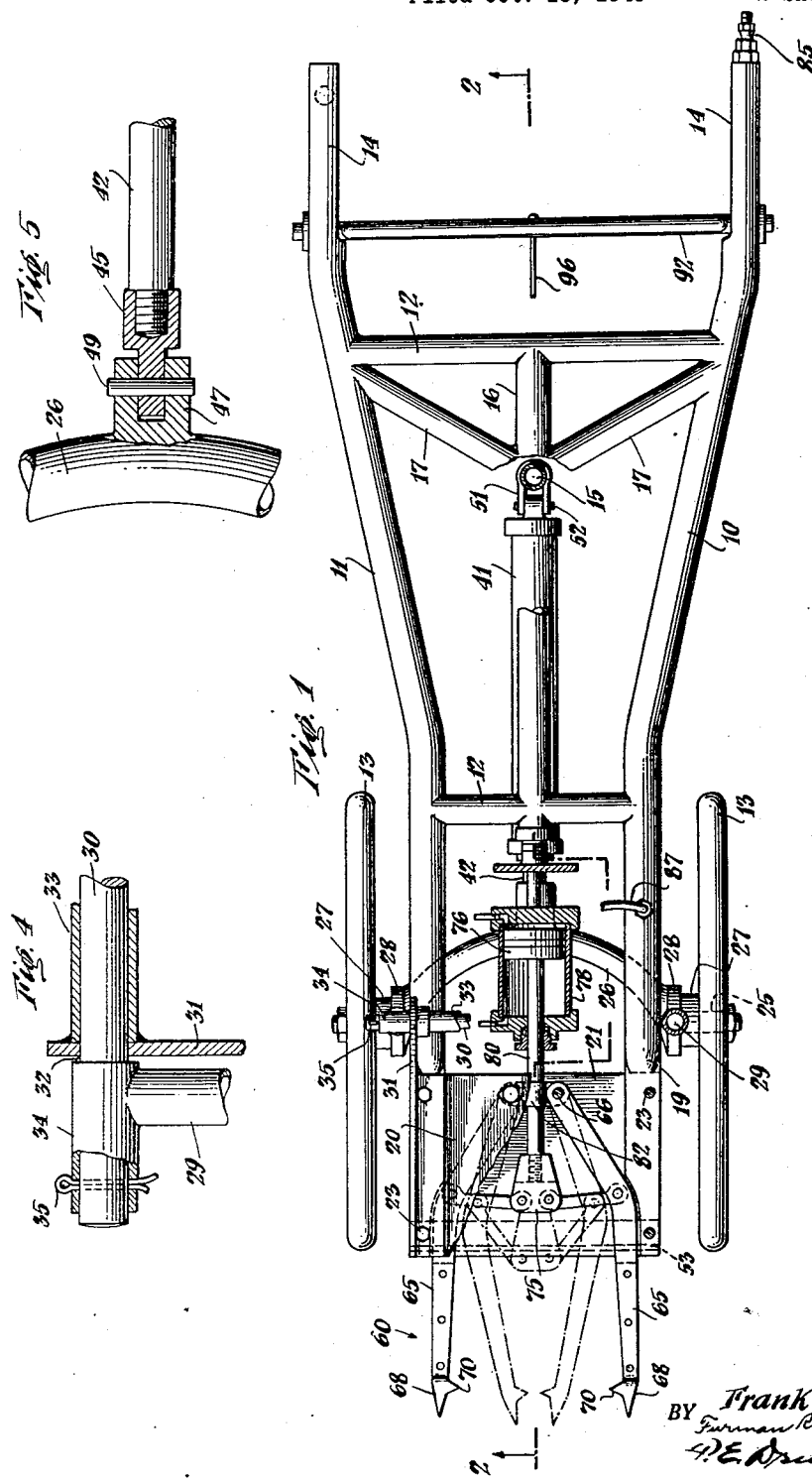
INVENTORS
Carl Gall
Frank J. Prucha
BY
ATTORNEYS

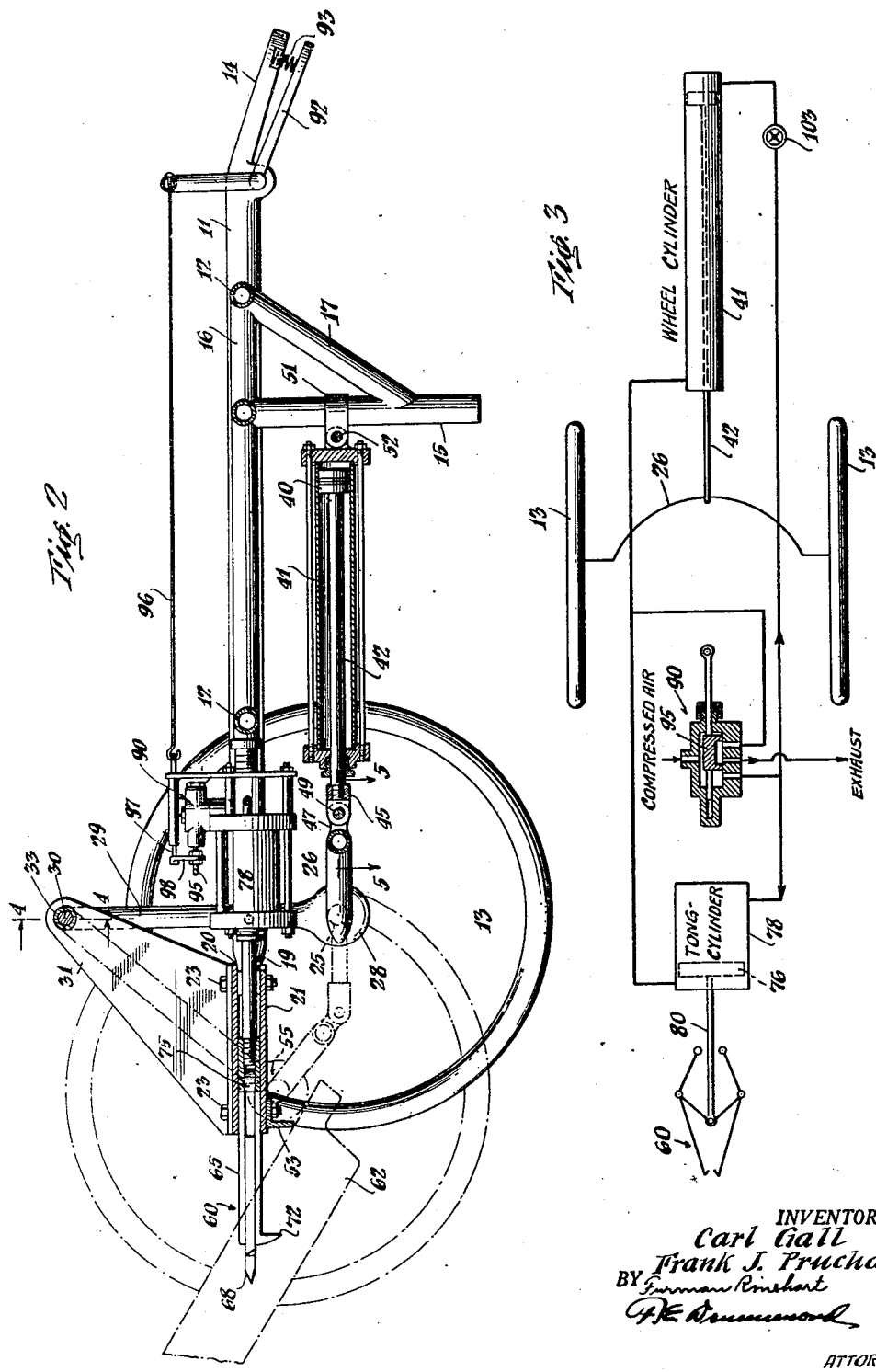

Patented Nov. 14, 1944

2,362,749

UNITED STATES PATENT OFFICE 2,362,749

TRUCK FOR HANDLING PIG METAL

Carl Gall and Frank J. Prucha, Omaha, Nebr., assignors to American Smelting and Refining Company, New York, N. Y., a corporation of New Jersey Application October 18, 1943, Serial No. 506,706

14 Claims. (Cl. 214—65.5)

This invention relates to a machine for picking up and conveying metal in the form of pigs or cakes and more particularly to a truck for handling pig lead, pig iron and the like. The invention has been used advantageously for unloading pig lead from railway cars and eliminates the back breaking task of lifting and carrying the heavy metal pigs from the floor of the car.

In accordance with the present invention a truck is provided consisting essentially of a strong, braced frame terminating in a pair of handles at one end and having tongs or the like mounted on the other end and for gripping the metal cake, the frame and attached tongs being supported intermediate its ends on a pair of wheels which are shiftable relative to the frame. Normally the wheels of the truck are positioned so that the weight of empty truck is suitably balanced on the wheels whereby it can be moved about with ease. When, however, a metal pig is gripped by the tongs preparatory to removing it, the wheels of the truck are shifted forward toward the load to offset the added weight of the pig and more nearly balance the combined weight of the pig and truck on the wheels so that very little effort is required to handle the loaded truck.

According to the preferred embodiment of the invention compressed air operated cylinders mounted on the frame are utilized to actuate the tongs and shift the wheels. A four-way slide valve mechanism, which is operated by a lever attached to one of the handles of the truck, is positioned on the frame whereby the operator can actuate both air cylinders simultaneously. When the air cylinder operated tongs are actuated to grip the pig the valve is concurrently positioned to admit compressed air to the cylinder controlling the position of the wheels whereby they are automatically shifted from their normal position for balancing the empty truck load on the wheels to a suitable position to counteract the added weight of the pig. After the pig has been transported to its new location the operator changes the valve setting to cause the tongs to open and release the pig and at the same time the wheels of the truck are shifted back to their normal empty-truck balancing position.

The invention also consists in certain new and original features of construction and combinations of parts hereinafter set forth and claimed. Various other objects and advantages will be apparent as the invention is described in more detail.

Although the novel features which are believed to be characteristic of this invention will be pointed out more particularly in the claims appended hereto, the invention itself as to its objects and advantages, and manner in which it may be carried out, may be better understood by referring to the following description taken in connection with the accompanying drawings in which a specific embodiment thereof has been set forth for purposes of illustration.

In the drawings:

Fig. 1 is a plan view, partly broken away and certain parts being shown in section, of a truck embodying the present invention;

Fig. 2 is a vertical sectional view taken substantially on the line 2—2 of Fig. 1 and looking in the direction of the arrow;

Fig. 3 is a detail view showing a section through the four-way slide valve and illustrating diagrammatically how it is connected to the air cylinders;

Fig. 4 is a fragmentary detail view partly in section and taken substantially on the line 4—4 of Fig. 2; and Fig. 5 is a fragmentary detail view in section taken on line 5—5 of Fig. 2.

Referring to the drawings more in detail and wherein like reference characters refer to like parts throughout the several figures, the truck illustrated in Figs. 1 and 2 embodying our invention consists of a chassis frame, preferably constructed of light weight material, having tubular shafts 10 and 11 joined by cross pieces 12 to form a sturdy frame which is suitably supported near the front end by the wheels 13. Shafts 10 and 11 extend to the rear and their extremities are shaped to provide a pair of handles 14 which are used by the operator in manipulating the truck. To support the handles at a convenient height when the truck is not in use a post 15 is provided which is attached to and depends from a centrally disposed bar 16 interconnecting the cross pieces 12 of the frame, the post being firmly held against lateral movement by side braces 17 which are attached to the shafts 10 and 11.

The forward ends of the shafts 10 and 11 are flattened, as indicated at 19 to form a suitable base for the plates 20 and 21, one mounted on top and the other on the underside of the shafts 10 and 11, being fastened together and to the shafts by bolts 23. Wheels 13 which support the frame structure described are suitably retained on the stub axles 25 formed on the outer ends of the U-shaped axle shaft 26. An inwardly extending hub portion 27 on the wheels is adapted to abut a shoulder 28 on the axle and space the body of the wheel a sufficient distance from the frame structure to accommodate the axle supporting rocker arms 29 arranged at the sides of the frame. The rocker arms are fixed at their lower ends to the shoulders 28 on the axle shaft 26 and form a trunnion mounting for the wheel and axle mechanism as illustrated in Fig. 2.

Preferably the rocker arms 29 are made of steel or the like metal tubing and attached at their upper end to a shaft 30 which is rotatively supported intermediate its ends by brackets 31. In the construction illustrated in Fig. 4 the shaft 30 is supported adjacent each end by a bracket 31 which is fastened to the frame, as by the bolts 23 commonly utilized to secure the plates 20 and 21 to the frame. Suitable apertures 32 in the brackets are provided near the outer end to receive the shaft 30. To form a sturdy support for the shaft 30 a tubular section 33 is suitably fixed to the brackets, as by welding, and forms a sleeve in which shaft 30 turns. For attaching the rocker arms 29 to the shaft 30 the upper end of each rocker arm is welded to a hub portion 34. This hub is arranged to fit over the end of the shaft 30 and the parts are keyed together by a pin 35, as illustrated in Fig. 4.

The wheels of the truck which are swingably supported on the trunnion mounted shaft 30 as described is shifted from one position to another as indicated by the dotted lines on Fig. 2. To provide suitable mechanism for doing this a piston 40 is used which reciprocates in the cylinder 41 and is connected to the axle shaft 26 by a piston rod 42. The cylinder 41 is suspended beneath the central portion of the frame and is pivotably supported at one end by the post 15. A strap 51 being utilized for this purpose which is clamped to the post and is suitably fastened to the end of the cylinder by a pin 52. The opposite or working end of the cylinder 41 is attached to the shaft 26 by the piston rod 42, link 45, suitably threaded together, the link in turn being connected through a pin 49 to the lug 47 which is integrally joined to the axle shaft 26, as shown in Fig. 5.

When the piston 40, in Fig. 2, is moved to the left the axle shaft 26, attached arm members 29 and wheels 13 are rocked as a unit with the pivot shaft 30 to the position shown in dotted lines in Fig. 2. In this position the outer ends of axle 26 adjacent the stub axles 25 are positioned against the plate 21 and bumper angle iron 53 bolted thereto so that the fulcrum point is moved forward from the pivot shaft 30 to where the frame rests on the axle shaft 26 and generally indicated at 55. This advanced position of the truck wheels is assumed when the tongs, generally indicated at 60 are positioned to grip a pig as illustrated at 62 in Fig. 2.

The tongs 60 are mounted on the front end of the truck, preferably between the plates 20 and 21, and comprise a pair of suitably shaped legs 65 which are pivotally fastened at one end to the plates, as by bolts 66, being arranged to extend out from beneath the plates, as shown in Fig. 1. Pig-gripping irons 68 are bolted or otherwise firmly attached to the outer ends of the leg members 65. These pig-gripping irons 68 are suitably pointed at their ends and are provided with opposed inwardly projecting sharp spines 70 for grasping the pigs. A depending hook 72 formed on the outer ends of the legs 65 is utilized for turning or arranging pigs which may lie crosswise to the truck so that they can be readily grasped by the tongs.

The tongs are operated through a toggle joint 75, constructed as shown in Fig. 1. This toggle joint is actuated to cause opening and closing of the tongs by a piston 76 which reciprocates in the cylinder 78, the piston being connected to the knee of the toggle joint by a piston rod 80. Cylinder 78 is suitably mounted on the frame of the truck immediately adjacent the tongs and the piston rod 80 is guided by the bracket 82 positioned between the pivoted ends of the leg members 65 to provide a smoothly operating mechanism for opening and closing the tongs.

In the embodiment illustrated the cylinders 41 and 78 are arranged for operation using compressed air, however, it will be understood other suitable fluid pressure medium such as steam or the like may be used. Further, if desired, equivalent mechanical means may be substituted for the compressed air operated piston mechanism shown for operating the tongs and shifting the wheels of the truck.

The air operated cylinders 41 and 78 in the device shown is adapted to be operated by compressed air which is conducted from a compressor, not shown, through suitable flexible air hose arranged for connection to a nipple 85 adjacent the handle on the end of the tubular shaft 10 as illustrated in Fig. 1. Preferably the tubular shaft 10 is utilized to provide an air reservoir, air connection being made thereto, as at 87, to a four-way valve 90 mounted on the frame as illustrated in Fig. 2.

To operate the valve 90 a lever 92 is conveniently arranged for actuation on the handle. Squeezing this lever against the action of the spring 93 shifts the valve member 95, which is operatively connected thereto through the rods 96, 97 and link 98, to admit air simultaneously to the cylinders 41 and 78 as illustrated in Fig. 3. The valve connections are arranged similarly as shown diagrammatically in Fig. 3 so that when the piston 78 operating the tongs moves them to open or release position, piston 41 which positions the wheels is likewise operated to shift the wheels rearward to the near-operator position. As indicated in Fig. 3, a valve 103 is preferably placed in the line to provide for cutting off the air to the wheel shifting cylinder. This valve may also be utilized to control the speed at which the air pressure is admitted to the cylinder 41.

During use the wheels and tongs of the truck are normally maintained in the position shown in full lines in Fig. 1, that is the tongs are open and truck wheels in rearmost position to balance the empty truck. When the truck is moved in position so that the tongs can grip the pig metal air pressure is admitted to the cylinders 41 and 78 to close the tongs about the pig and shift the wheels forward to balance the load. Further, by curving the axle shaft 26 away from the tong end of the truck as illustrated in the drawings, wheel and axle mechanism can be moved forward to a position near the outer end of the truck frame without encountering interference with the pig metal gripped by the tongs.

The pig metal transfer truck is light in weight, sturdy and of simple construction. By utilizing our invention the laborious task of lifting pig metal by hand from the ground, platform or floor and transporting it to a charging machine for delivery to a softening furnace is eliminated. Further, the danger of sustaining injury through manual handling of metal pigs has been greatly lessened by the use of our invention. Heretofore workmen handling heavy metal bullion, such as pig iron or pig lead, were required to have great physical strength and stamina, and even then few could endure working at this task for any length of time. The present invention, however, has alleviated this difficulty and permits a workman of average or less than average physical constitution to handle the loading and unloading of pig metal without fatigue.

It will be apparent that the present invention provides a machine which is adapted to be used in handling a variety of materials and articles other than metal bullion. The various uses to which our novel truck may be put is, of course, contemplated as constituting a part of our invention.

While certain novel features of the invention have been disclosed and are pointed out in the annexed claims, it will be understood that various omissions, substitutions and changes may be made by those skilled in the art without departing from the spirit and scope of this invention.

What is claimed is:

1. A truck of the class described comprising a frame, wheel and axle means for supporting and transporting said frame, tongs mounted on the front end of said frame operable to grip a pig or cake of metal which is to be handled, means comprising handles for guiding and manipulating the truck, means for shifting said wheel and axle mechanism from empty-truck position to loaded-truck position and vice versa whereby the fulcrum is moved toward the front end of the truck frame when the tongs are loaded and rearward to an empty-truck position when the tongs release the load.

2. A truck of the class described comprising a frame, wheel and axle means for supporting and transporting said frame, said frame comprising a pair of shafts which terminate in handles at one end, means attached to the opposite end of said frame for gripping metal pigs or cakes to be handled, said frame and pig-metal gripping means being supported on said wheel and axle mechanism intermediate the ends of said frame, means for positioning said wheel and axle support relative to said frame so that the weight of the empty truck is substantially balanced on the wheels, said last mentioned means being operable to shift said wheel and axle support to a different position relative to the frame when the truck is loaded to offset the added weight of the load and substantially balance the combined weight of the load and truck frame on said wheel and axle mechanism.

3. A truck of the class described comprising a frame, wheel and axle means for supporting and transporting said frame, means for guiding said truck comprising shafts which terminate in handles, means attached to front of said frame for loading metal pigs or cakes which are to be picked up and conveyed, said frame and pig metal loading means being supported on said wheel and axle mechanism which is disposed intermediate the ends of said frame, said wheel and axle means being mounted on a trunnion whereby the wheel and axle can be shifted relative to the frame from empty-truck position to loaded-truck position to substantially balance the load on the wheels, means comprising a piston actuated mechanism for shifting said wheel and axle and means comprising a piston actuated means for operating said pig metal loading mechanism.

4. A truck of the class described comprising a frame, said frame terminating in handles on one end, and at the opposite end having tongs carried thereby, means for operating said tongs to grip a pig or cake of metal which is to be handled, wheel and axle mechanism for supporting said frame, said wheel and axle mechanism being mounted on a trunnion whereby the same can be shifted relative to said frame, means for shifting said wheel and axle mechanism to move the fulcrum toward the front end of the frame when the tongs are in loaded position and rearwardly when said tongs are in unloaded position whereby the fulcrum is shifted relative to the frame to balance the empty and loaded truck respectively on the wheels so that very little effort is required to handle the empty or loaded truck.

5. In a truck for handling pig metal and the like comprising a light weight sturdy frame, the combination of means attached to the frame for picking up pig metal, wheel and axle means secured to the frame for supporting said frame, means for shifting the wheel and axle mechanism when the truck is loaded to substantially balance the loaded truck on the wheel and axle support and to a different position when the truck is unloaded, said wheel and axle mechanism being shifted from its normal empty truck position when the truck is loaded to offset the added weight of the load and returned to its normal position when the truck is unloaded so that both the loaded and empty truck can be readily manipulated.

6. A truck for picking up and conveying pig metal or the like comprising a frame, a pair of wheels carried thereby, means for gripping the pig metal preparatory to removing it mounted on said frame, fluid operated piston means carried by said frame for actuating said pig-gripping means to load and unload said last mentioned means, additional fluid operated piston means mounted on said frame which is operatively connected to said wheels for positioning the wheels relative to the frame whereby the empty truck and loaded truck is more nearly balanced on said wheels, said wheel positioning means being operable to shift the fulcrum toward the load-receiving end of the frame and the opposite end, means for steering said truck and means carried thereby which is actuated by an operator manipulating the truck for bringing about the actuation of both the pig-loading piston and the wheel-positioning piston.

7. The combination with a truck having a frame terminating in a pair of rearwardly extending handle bars and supported intermediate its ends by wheel and axle means and provided with means for gripping an article which is to be handled, of mechanism for moving said wheel and axle as a unit from a rearwardly to a forwardly position relative to said frame, means for actuating said article gripping mechanism whereby the article may be picked up and conveyed to a new location and unloaded from said gripping means, and means carried by the frame and mounted adjacent the handle bars which is operatively connected to the article gripping and wheel and axle moving means for controlling the actuation of said article gripping and wheel and axle moving means.

8. In a transfer truck of the class described, the combination with means for gripping and holding shaped articles which are to be transported and carried by a guidable frame supported on wheel and axle mechanism of compressed air operated piston means for actuating said article gripping means, a second compressed air operated piston means operatively connected to said wheel and axle mechanism for positioning said wheel and axle mechanism relative to said frame so that the load of the empty truck and loaded truck is maintained substantially balanced on the wheel and axle support whereby the truck can be transported about with ease whether loaded or unloaded.

9. A machine for picking up and transporting articles comprising an elongated frame, wheel supporting means therefor arranged intermediate the ends of said frame, a pair of tongs for grasping and holding an article to be transported, said tongs being operatively mounted on one end of said frame, handle means on the opposite end of the frame, means for operating said tongs to grip said article and release same, said tong operating means being controlled by mechanism attached to said handle, means for positioning said wheel member relative to said frame and operable to shift the wheel supporting means toward the tong end of the frame when the tongs are operated to grip the article which is to be transported and means carried by said frame which is operable for controlling the actuation of said tongs and said wheel positioning means.

10. A machine for picking up and transporting metal pigs or billets comprising a light weight tubular frame suspended between a pair of wheels, said pair of wheels being trunnion mounted on said frame and arranged so that they can be swung back and forth relative to said frame, a compressed air operated piston means carried by the frame for swinging said wheels back and forth, tongs on said frame adapted to grip the metal shape which is to be transported, a second compressed air operated piston means mounted on said frame for actuating said tongs, valve means carried by said frame which is operated to control the actuation of said tongs and said wheel swinging means and hook means on said tongs for engaging a metal shape whereby the same can be turned to a position such that it may be grasped by said tongs.

11. A machine for picking up and transporting articles comprising a light weight tubular frame suspended between a pair of wheels, said frame comprising a tubular shaft terminating in a handle at one end and a pair of tongs at the other, means for operating said tongs, said wheels being pivotally attached to the frame and arranged so that they can be shifted forward or backward relative to said frame, and means carried by said frame and operable from the handle position for actuating said tong operating and wheel shifting means.

12. A machine for picking up and transporting articles comprising a frame suspended between a pair of wheels, said frame comprising a tubular shaft terminating in a handle at one end and a pair of tongs at the other, said wheels being pivotally attached to the frame and arranged so that they can be shifted forward or backward relative to said frame, a compressed air operated piston carried by said frame for shifting said wheels back and forth, a second compressed air operated piston carried by said frame for operating said tongs, said tubular shaft forming an air reservoir to which said pistons are operatively connected and valve operating means attached to said handle for operating said pistons to open and close the tongs and position said wheels.

13. In a machine of the class described having a frame and attached tongs for gripping pig metal to be conveyed, the combination with a source of compressed air supply of piston means mounted on the frame for actuating said tongs, wheel means attached to the frame providing a carriage, means comprising a piston for positioning said wheels relative to the frame, said wheels being shifted from a no-load tong position to a loaded tong position, valve and interconnecting conduit means mounted on said frame and connected to said compressed air supply for operating said tongs and wheel positioning mechanism and additional valve means interposed between said first mentioned valve and said wheel positioning piston whereby the time of actuation of said wheel positioning piston relative to the operation of said tong actuating piston may be controlled.

14. A machine for picking up and conveying pig metal and the like comprising a frame, having an elongated shaft terminating in a handle at one end and a pair of tongs at the other, fluid pressure operated piston means carried by said frame for operating the tongs whereby pig metal can be picked up and conveyed, wheel means disposed intermediate the ends of said frame for supporting and transporting said tongs and associated operating means, a second fluid pressure operated piston means mounted on said frame and connected to said wheel means for positioning the wheel means relative to the frame, said wheels being shifted toward the tongs when the same are loaded and shifted away from the tongs toward the handle part of the shaft when the tongs are unloaded.

CARL GALL.
FRANK J. PRUCHA.